(12) United States Patent
Albou

(10) Patent No.: US 7,025,483 B2
(45) Date of Patent: Apr. 11, 2006

(54) LIGHT DEVICE FOR AUTOMOBILE OVERHEAD LIGHTS

(75) Inventor: Pierre Albou, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 10/603,288

(22) Filed: Jun. 24, 2003

(65) Prior Publication Data

US 2004/0001343 A1    Jan. 1, 2004

(30) Foreign Application Priority Data

Jun. 28, 2002   (FR) .................................. 02 08277

(51) Int. Cl.
*B60Q 1/00* (2006.01)
(52) U.S. Cl. ...................... 362/538; 362/539; 362/509
(58) Field of Classification Search ................ 362/538, 362/539, 520, 522, 509, 328
See application file for complete search history.

(56) References Cited

U.S. PATENT DOCUMENTS

| | | | | |
|---|---|---|---|---|
| 3,266,016 A | * | 8/1966 | Shiegeru et al. ............ 362/494 |
| 4,796,171 A | | 1/1989 | Lindae et al. | |
| 5,014,173 A | * | 5/1991 | Lindae et al. ................ 362/510 |
| 5,169,224 A | * | 12/1992 | Segoshi et al. .............. 362/539 |
| 6,152,589 A | * | 11/2000 | Kawaguchi et al. ......... 362/518 |
| 6,155,702 A | * | 12/2000 | Blusseau et al. ............. 362/520 |
| 6,210,028 B1 | * | 4/2001 | Murakoshi et al. .......... 362/538 |
| 6,340,239 B1 | * | 1/2002 | Godbillon et al. ........... 362/521 |
| 6,352,359 B1 | * | 3/2002 | Shie et al. ................... 362/522 |
| 6,416,210 B1 | * | 7/2002 | Uchida ........................ 362/539 |
| 6,543,923 B1 | * | 4/2003 | Tamai ......................... 362/521 |
| 6,698,912 B1 | * | 3/2004 | Yang ........................... 362/516 |

FOREIGN PATENT DOCUMENTS

| | | |
|---|---|---|
| DE | 4031352 A | 4/1992 |
| DE | 19519872 A1 | 12/1995 |
| FR | 2770617 A1 | 5/1997 |
| FR | 2796450 A1 | 1/2001 |

* cited by examiner

*Primary Examiner*—John Anthony Ward
*Assistant Examiner*—Jacob Y. Choi
(74) *Attorney, Agent, or Firm*—Morgan Finnegan LLP

(57) ABSTRACT

The present invention relates to a projection device in which a projection lens has undergone arrangements at its exit surface, and more particularly side areas of this exit surface. The arrangements are intended to divert certain light rays emitted by a light source of the light in order to illuminate overhead lights without interfering with the homogeneity of the light beam of said light. The arrangements made may consist of protuberances in the form of serrations.

20 Claims, 2 Drawing Sheets

LIGHT DEVICE FOR AUTOMOBILE OVERHEAD LIGHTS

FIELD OF THE INVENTION

The object of the present invention is a light device equipping motor vehicles and obtaining overhead lights points in accordance with the regulations.

BACKGROUND OF THE INVENTION

Its purpose is in particular to propose a particular embodiment of lights which, whilst comprising a shield intended to prevent diffusion of light upwards, obtains a sufficient light intensity for satisfactory viewing of certain elements placed in various areas situated above a central axis of the beam emitted by the light.

The field of the invention is, in general terms, that of automobile lights. In this field, various types of light are known, amongst which there are essentially:

side lights, of low intensity and range;
  dipped lights, of higher intensity and with a range on the road of approximately 70 meters, which are used essentially at night and where the distribution of the light beam is such that it does not dazzle the driver of a vehicle being passed;
  long-range driving lights, and additional lights of the long-range type, where the area of vision of the road is around 200 meters, and which must be switched off when passing another vehicle in order not to dazzle its driver;

Overhead light corresponds to the French term; "Point de Portique"

vehicle in order not to dazzle its driver;
  fog lights.

The light device according to the invention is more particularly intended to be used as a dipped light, but the particularity of its structure, and in particular its projection lens, could be reproduced on other types of light in order to meet various requirements.

In the state of the art, essentially two types of light each having a distinct structure are known for dipped lights.

The first type of light is composed essentially of a reflector associated with a light source. The reflector consists of a mirror comprising a set of serrations, or areas of various shapes, thus producing a complex surface whose form, which was previously the subject of precise calculations, reflects the light signals emitted by the light source in order to produce a light beam essentially oriented horizontally and downwards.

The second type of light is illustrated in FIG. 1. This figure depicts a side view in section of a dipped light 100 known from the state of the art. A dipped light of this type comprises essentially a reflector 101, a light source 102, radiating a power in the form of emitted light signals 103, disposed close to the top of the reflector 101, and an exit surface 104 for a light beam 106. The exit surface 104 can for example be a glass of the plastic type; it preferably does not have any optical properties, that is to say it does not divert the light rays passing through it, or only a little.

Before reaching the exit surface 104, the light signals 103 are caused to pass through a lens 105 either directly or after reflection on the reflector 101. This lens is usually of the convex circular type. It is called a projection lens. It has an entry face 110 and an exit face 111. It diffuses the light beam 106, whose orientation and range depend in particular on the arrangement of the lens 105 within the projection device 100 and the optical characteristics of the lens 105. A central part of the light source 102 is preferably disposed in the focal area of a first focus F1 of the reflector 101, and the focus of the projection lens 105 is situated in the focal area of a second focus F2 of the reflector 101. Thus a light signal 103 emitted by the central part of the light source 102 will pass through the second focus F2 of the reflector 101 and will leave the projection lens 105 horizontally or approximately horizontally. With the exception of the light signals which are reflected on ends 107 of the reflector 101, all the light signals 103 emitted by the central part of the light source 102 converge towards the second focus F2.

In general terms, the expression light signals is used for all the light signals emitted by the light source 102, and light beams for all the light beams which are actually emitted by a light at the exit surface 104, or at the projection lens 105.

In this second type of light, a shield 108 is interposed between the reflector 101 and the projection lens 105. The shield 108 is disposed in a plane parallel to the projection lens 105, approximately level with the object focal plane of the lens, so that the image of the shield is emitted to infinity. By virtue of the presence of such a shield 108, the light beam 106 which is actually emitted by the light device 100 is not emitted above a cutoff line determined by the shape of an upper part 109 of the shield 108.

FIG. 2 gives an example of the form 200 of the light beam 106 projected on a screen. A cutoff line 201 marks the boundary between a bottom area where the light intensity is sufficient to illuminate the road and satisfy the various regulations laid down and an upper area where the light intensity is almost zero. The cutoff line 201 has a change in height at a central axis 203 of the beam. The form 201 depicted, with a light beam higher on the right-hand part of the projection, corresponds to that of a vehicle light traveling in a country where travel is required on the right. In a country where travel is required on the left, a form would be obtained which, with respect to a vertical axis 202, would be symmetrical with that shown.

The two types of light described are available today on the market. Vehicle manufacturers choose one or other of these types of light essentially according to aesthetic criteria, the two types of light not having the same appearance.

However, a problem is posed with the second type of light described. This is because, though it is true that the light intensity must be low above the cutoff line 201, the various regulations nevertheless require that a minimum light intensity be emitted in certain directions situated above the cutoff 201. In particular, various regulations require a minimum light intensity at certain points situated above the cutoff line, these points being called overhead lights, since they correspond approximately to points in the vicinity of which there are situated panels of the motorway panel type when these panels are at a given visibility distance from the vehicle. For example, in American regulations, four overhead lights are found which are respectively situated at $2u4l$, $4u8l$, $2u4r$ and $4u8r$ with respect to the optical axis of the lens, the figures corresponding to degrees, "u" corresponding to "up", "l" corresponding to left and "r" corresponding to right.

Various solutions have been proposed in the state of the art for illuminating these overhead lights whilst keeping the shield 108 in the projector device.

A first solution consists of providing a hole in the shield 108. If this hole is disposed at the correct point, an approximately rectangular illuminated area above the cutoff line is then obtained, this area containing the overhead lights. The regulatory requirements are then satisfied, but the light intensity diffused in the rectangle is such that it is unpleasant—or even a nuisance—for the driver.

A second known solution consists of slightly frosting the entry face of the lens 105. Some of the light signals are thus diverted from their initial path and some are emitted in the direction of the overhead lights. However, such a method has several drawbacks: firstly the frosted surface diffuses light almost isotropically, a large quantity of energy being wasted, including in areas of the beam where the intensity is already relatively low; secondly, the production of molds for obtaining a frosted surface is very tricky, the mold itself being little by little polished by the glass used to manufacture the lens. In practice, it is therefore necessary to carry out a surfacing operation in order to obtain a slightly frosted face, this operation following the molding operation.

SUMMARY OF THE INVENTION

The device according to the invention meets the problems which have just been disclosed. In general terms, the device according to the invention proposes a solution which provides, in a controlled fashion, a light intensity at the overhead lights and close to these points whilst keeping the presence of a shield in order not to dazzle motorists being passed and keeping good homogeneity of the light being produced by the projection device for illuminating the road.

To this end, in the invention, a modification to the exit surface of the projection lens is proposed, and more particularly of certain areas of this exit surface. In addition, in the invention, it has been shown that, in the projection devices comprising a shield which are frequently used, the light rays passing through the projection lens in a central part constitute essentially the ends of the light beam emitted, whilst the light rays passing through the projection lens at the side parts of the projection lens constitute essentially the central part of the light beam. This observation makes it possible to determine certain areas of the lens where it is preferable to make certain arrangements for diverting sunlight rays without interfering with the homogeneity of the light beam.

The arrangements made consist preferably of thicker parts in the form of flutes, which it makes it easier to produce molds for manufacturing the lenses.

The invention therefore concerns essentially a projection device for a motor vehicle, comprising in particular a reflector, a light source producing a set of light signals which can be reflected by the reflector, an exit lens comprising an entry surface and an exit surface, for producing a light beam, and a shield disposed between the reflector and the exit lens in order to produce a cutoff in the light beam produced, the exit lens comprising a set of arrangements produced in at least one side part of the exit surface of the lens, each arrangement being able to divert, in a given direction, some of the light signals encountering this arrangement.

The device according to the invention can also have one or more of the following characteristics:

the arrangements are produced on the side parts of the exit surface of the lens, in particular solely on these side parts. In fact, it is advantageous for these arrangements to be situated laterally, so as to leave the area of the lens which faces the lamp hole at the bottom of the reflector with no arrangement. This lamp hole is normally cylindrical or substantially cylindrical, with diameters for example of around 20 to 30 mm. Preferably, a central area of the lens with dimensions the same order of magnitude as this hole are therefore left without any arrangement. This central area can have various forms which will be illustrated below.

these arrangements distributed in side areas are preferably symmetrical, in particular with respect to a substantially vertical axis, as illustrated below, the diversion directions are directions situated above the cutoff;

each arrangement (or at least one of them) is able to divert some of the light signals encountering this arrangement in a direction corresponding to an overhead light;

each arrangement (or at least one of them) is produced in the form of a protuberance on the exit surface of the lens;

the protuberance has a thickness of between 0.2 millimeters and 3 millimeters, in particular between 0.2 millimeters and 2 millimeters, or between 0.5 millimeters and 1 millimeter;

the lens comprises at least two distinct arrangements able to divert some of the light signals in distinct given directions;

the lens comprises at least two distinct arrangements in each of its side parts, and in particular four arrangements or six arrangements;

the lens comprises four, six or twelve distinct arrangements;

the lens comprises several arrangements able to divert some of the light signals in the same given direction;

each arrangement (or at least one of them) produced in the lens exit surface comprises an exit surface with an end situated at the periphery of the exit lens, or in the immediate vicinity of the periphery of the exit lens;

at least one of the arrangements is produced in the form of a flute the arrangements produced in the exit surface of the lens are disposed on the exit surface of the lens symmetrically with respect to a vertical axis of the lens.

Another object of the invention is a motor vehicle equipped with a projection device including one of the characteristics which have just been mentioned.

The invention and its various applications will be understood better from a reading of the following description and an examination of the figures which accompany it. These are presented only as an indication and in no way limiting the invention. In particular, the projection device according to the invention is illustrated in the case of use in a dipped light, but this device is suitable for any projection device of a vehicle. The figures show:

DESCRIPTION OF THE PREFERRED EMBODIMENTS

Figure 1:
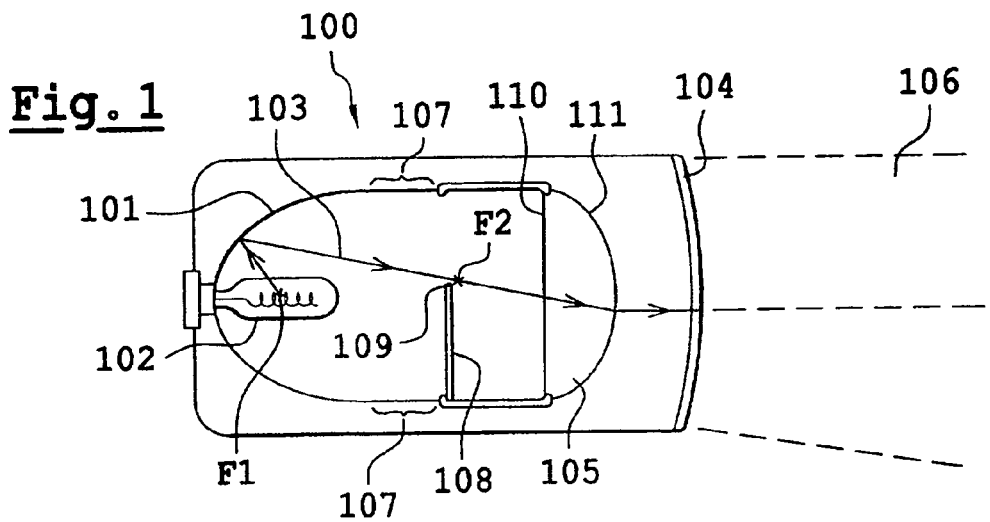
In FIG. 1, already described, a projection device of the state of the art.
Figure 2:
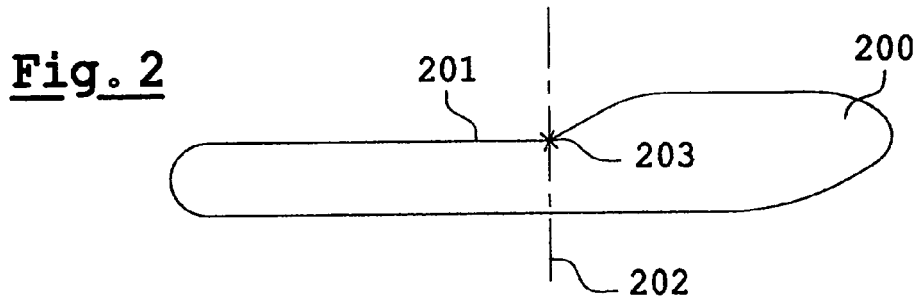
In FIG. 2, already described, a representation of the light beam emitted by the projection device of FIG. 1.
Figure 3:
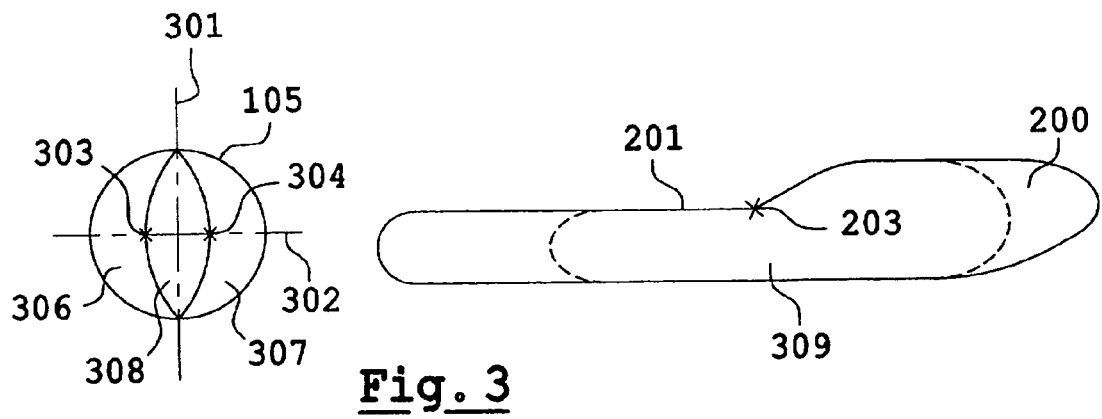
In FIG. 3, an illustration of the correspondences between the areas of the projection light through which the light rays pass and light areas in the light beam emitted.

In the various figures, the elements which are common to several figures will have kept the same references. FIG. 3 shows a projection lens 105 in front view, that is to say as it can be seen when facing the light. The lens shown is circular; in other examples, it could be elliptical. A vertical axis 301 and a horizontal axis 302 intersect at the center of the circle 105. On a diameter supported by the horizontal axis 302, a first point 303 and a second point 304 are located, disposed so that they divide the diameter in question into three segments of substantially equal sizes. In this way three distinct areas are defined on the exit surface of the lens 105: a first side surface 306 included between the left-hand end of the lens and an arc of a circle passing through the point 303 and the ends of the diameter supported by the vertical axis 301; a second side surface 307 included between the right-hand end of the lens and an arc of a circle passing through the point 304 and the ends of the diameters supported by the vertical axis 301; and a central surface 308 included between the side surfaces 306 and 307.

In the embodiment of the projection device according to the invention, it has been remarked that, because of the structure of the reflectors commonly used, the light rays which pass through the projection lens at the side surfaces 306 and 307 are essentially the rays which constitute a central part 309 of the light beam 200. It is in this central part that the light intensity is the greatest, and each area of this central part 309 receives light rays coming both from the first side surface 306 and the second side surface 307.

In the invention, the idea was therefore had of diverting some of the light rays passing through the lens 105 essentially at the side surfaces 306 and/or 307 in order to reorient the power thus diverted to the gantry points which are the subject of regulations in terms of minimum light intensity to be received. Because of the concentration of light rays arriving in the central area 309, diverting a small proportion passes unperceived. By proceeding thus, it is avoided causing discontinuities in the light beam which might result in dark spots in the projection of this beam.

In the case where the lens used is elliptic, the definition of the side and central areas remains the same, with a first point 303 and a second point 304 disposed so that the horizontal radius of the ellipse is divided into three segments of substantially equal sizes.

In the invention, it is therefore proposed to produce arrangements on various areas essentially contained in the lateral parts 306 and 307 of the exit face 111 of the projection lens 105. These arrangements consist of modifications in these areas of the exit face 111 of the projection lens 105. The orientation of the planes tangent to the exit face 111 of the lens is modified locally.

Figure 4:
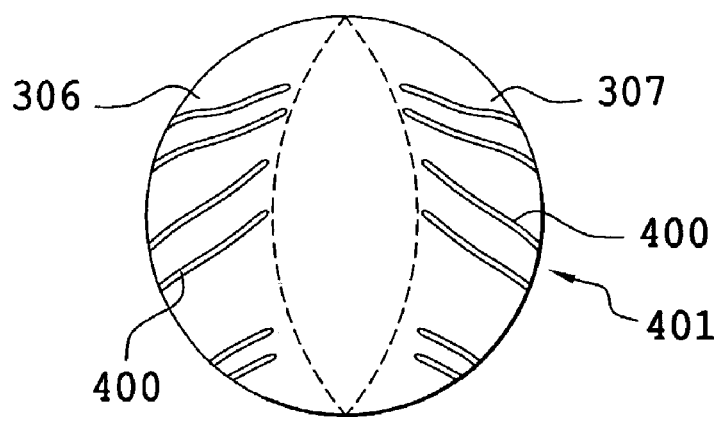
In FIG. 4, a front view of the projection lens used in the projection device according to the invention.

In a preferred example embodiment of the invention, illustrated in FIG. 4, it is proposed to carry out the modifications to the continuity of the exit surface of the lens 105 in the form of protuberant flutes 400 disposed in various areas of the side surfaces 306 and 307 of the exit face 111 in order to obtain a new projection lens 401. These flutes are produced as follows: each of the flutes 400 produced is intended to illuminate a particular overhead light. There is therefore imposed, for each of them, an overhead light direction aimed at. In the production of each flute 400, a maximum height of the protuberance created by the flute is also imposed; depending on the embodiment, this height can vary between 0.2 millimeters and 3 millimeters. With such constraints, when a starting point of the flute is chosen on the exit surface of the lens, the form of the flute is flute is no longer free but is the result of the resolution of a differential equation which imposes the position of each of the points on the line constituting this flute so that the latter has an exit surface such that the light rays passing through it are oriented towards the overhead light aimed at.

The form of each flute 400 is therefore not a parameter available to the manufacturer but is imposed by the intention to divert the light rays solely towards the overhead lights whilst maintaining a substantially constant flute thickness.

As stated, each flute is intended to illuminate a particular overhead light. However, several distinct flutes with distinct starting points on the exit face of the lens can serve to illuminate the same overhead light. Such a way of proceeding has several advantages: first of all, for a person situated in a direction corresponding to that aimed at in order to reach the overhead light, if only one flute is used to illuminate the overhead light in question, this person will perceive solely a very bright spot, which may be disagreeable. By multiplying the flutes for the same overhead light, the bright spots are multiplied whilst limiting the light intensity thereof. Next, multiplying the flutes for the same overhead light limits the length and width of each flute concerned, and thus limits the quantity of energy taken off in the same area of the light beam 200, and thus to limit the line constituting the flute to the side surfaces 306 and 307. However, in some embodiments, at least one flute may be slightly extended towards the central part of the lens.

In one example embodiment, the flutes do not stop on arcs, that is to say, for each side of the lens—left-hand side or right-hand side—the points constituting all the terminations of the various flutes, a termination point being the point on the flute closest to the center of the lens, are disposed not in an arc of a circle but in a straight line when looking at the lens in front view.

In the example proposed in FIG. 4, a lens 401 is shown having twelve distinct flutes 400; these flutes correspond in practice to four groups of three flutes, each group of flutes being intended to emit light rays in a direction corresponding to a single overhead light. The flutes 400 are disposed symmetrically with respect to the vertical axis 301 of the lens.

For reasons of simplification of the production of the mold in which the lenses 401 are manufactured, it is preferable to take as the starting point of a flute a point situated on the periphery of the lens 401, or close to this periphery, that is to say at less than 1 centimeter from the periphery.

Finally, it should be stated that the calculations leading to the forms of the various flutes are made rigorously for a light ray emitted from the focus of the projection lens. The spread of the light source at the first focus F1 of the reflector 101, in particular because of the presence of a filament, provides a spread of the light rays diverted by the flutes around the overhead lights, thus creating a slight light halo around the overhead lights aimed at sufficient to give the impression of slight homogeneous illumination in an area containing the overhead lights. Consequently it may be sufficient to provide only two distinct arrangements on the surface of the lens and to make calculations so that each arrangement diverts light rays, emitted by a notional point source disposed at the focus F2, to a point situated approximately at the center of two overhead lights, for example the two overhead lights situated on the same side of the vertical axis 202. The halo formed around the two points aimed at can satisfactorily illuminate all the overhead lights.

Figure 5:
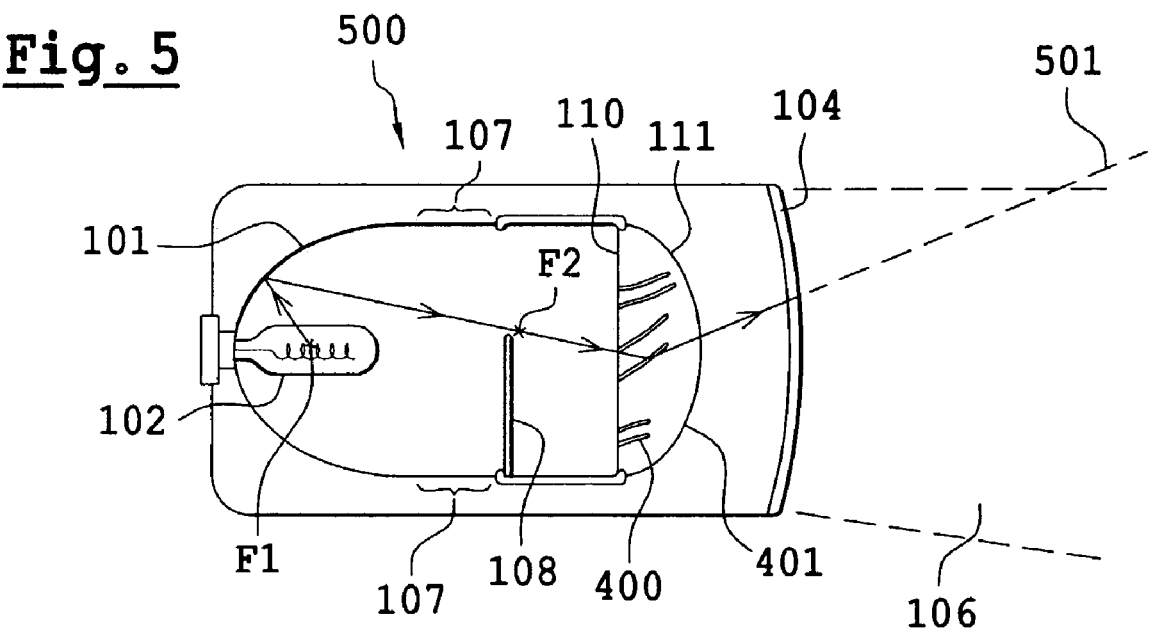
In FIG. 5, a projection device according to the invention.

FIG. 5 illustrates a projection device 500 according to the invention, in which it can in particular be seen that a part 501 of the light beam produced by the light 100 is oriented towards the overhead lights and is thus no longer contained in the main light beam 106.

It should be noted that the invention is particularly adapted to the regulations in force in the USA concerning the illumination of overhead lights, in particular in the case where light sources of the halogen rather than xenon type are used.

What is claimed is:

1. A projection device for a motor vehicle, comprising
   a reflector,
   a light source producing a set of light signals which can be reflected by the reflector,
   an exit lens, comprising an entry surface and an exit surface, for producing a light beam, and
   a shield disposed between the reflector and the exit lens in order to produce a cutoff in the light beam produced,
   wherein the exit lens comprises a central part of the exit surface which encompasses a region of the exit surface intersected by a vertical plane defined by an optical axis of the projection device, and first and second side parts of the exit surface laterally disposed on opposing sides of the central part, and a set of protuberances produced in at least one side part of the exit surface of the exit lens, each protuberance diverting in a given direction a part of the light signals encountering the protuberance, the protuberances being produced solely on the side parts of the exit surface of the exit lens.

2. A projection device according to claim 1, wherein the diversion directions are directions situated above the cutoff.

3. A projection device according to claim 1, wherein each protuberance is able to divert some of the light signals encountering the protuberance in a direction corresponding to a gantry point.

4. A projection device according to claim 1, wherein the protuberance has a thickness of between 0.2 millimeters and 3 millimeters.

5. A projection device according to claim 4, wherein the protuberance has a thickness of between 0.2 millimeters and 2 millimeters.

6. A projection device according to claim 5, wherein the protuberance has a thickness of between 0.5 millimeters and 1 millimeter.

7. A projection device according to claim 1, wherein the exit lens comprises at least two distinct protuberances diverting some of the light signals in distinct given directions.

8. A projection device according to claim 1, wherein the exit lens comprises at least two distinct protuberances in each of the first and the second side parts.

9. A projection device according to claim 8, wherein the exit lens comprises at least four distinct protuberances in each of the first and the second side parts.

10. A projection device according to claim 9, wherein the exit lens comprises at least six distinct protuberances in each of the first and the second side parts.

11. A projection device according to claim 1, wherein the exit lens comprises four, six or twelve distinct protuberances.

12. A projection device according to claim 1, wherein the exit lens comprises several protuberances diverting some of the light signals in the same given direction.

13. A projection device according to claim 1, wherein each protuberance produced in the exit surface of the exit lens has an end situated at a periphery of the exit lens.

14. A projection device according to claim 1, wherein the protuberances produced in the exit surface of the exit lens are disposed on the exit surface of the exit lens symmetrically with respect to a vertical axis of the exit lens.

15. A projection device according to claim 1, wherein at least one of the protuberances is produced in the form of a flute.

16. An automobile equipped with a projection device according to claim 1.

17. A projection device according to claim 1, wherein each of the protuberances produced in the exit surface of the exit lens has an end situated in an immediate vicinity of a periphery of the exit lens.

18. A projection device adapted to produce a set of light signals, the device comprising:
   a light source adapted to emit light;
   a reflector disposed to receive and reflect light generated by the light source to form a light beam having an optical axis;
   an exit lens disposed in the path of the light beam, the lens having an entry surface facing the light source and an opposing exit surface, the exit surface having a central part which encompasses a region of the exit surface intersected by a vertical plane defined by the optical axis, and first and second side parts, the side parts being laterally disposed on opposing sides of the central part, and
   a shield disposed between the reflector and the exit lens in order to produce a cutoff in the light beam produced,
   wherein the exit lens further comprises a plurality of modified surface regions having tangent planes that differ from adjacent surfaces of the lens, the modified surface regions being produced solely on the side parts of the exit surface of the lens, each of the modified surface regions diverting in a given direction a part of the light signals encountering the modified surface region.

19. A projection device according to claim 18, wherein the modified surface regions are produced on at least one of the first and second side parts of the exit surface of the lens.

20. A projection device according to claim 19, wherein the modified surface regions are produced on both the first and second side parts of the exit surface of the lens.

* * * * *